(12) United States Patent
Kondo et al.

(10) Patent No.: US 10,239,453 B2
(45) Date of Patent: Mar. 26, 2019

(54) PERIPHERY IMAGE DISPLAY CONTROL DEVICE

(71) Applicants: TOYOTA JIDOSHA KABUSHIKI KAISHA, Toyota-shi, Aichi-ken (JP); DENSO TEN Limited, Kobe-shi, Hyogo (JP)

(72) Inventors: Takashi Kondo, Miyoshi (JP); Yamato Yorifuji, Toyota (JP); Yasuyoshi Sawada, Kobe (JP)

(73) Assignees: TOYOTA JIDOSHA KABUSHIKI KAISHA, Toyota-shi (JP); DENSO TEN Limited, Kobe-shi (JP)

( * ) Notice: Subject to any disclaimer, the term of this patent is extended or adjusted under 35 U.S.C. 154(b) by 0 days.

(21) Appl. No.: 16/025,329

(22) Filed: Jul. 2, 2018

(65) Prior Publication Data
US 2019/0009719 A1    Jan. 10, 2019

(30) Foreign Application Priority Data
Jul. 4, 2017    (JP) .................................. 2017-131119

(51) Int. Cl.
*B60Q 9/00* (2006.01)
*B60R 1/00* (2006.01)
*G06K 9/00* (2006.01)

(52) U.S. Cl.
CPC ............... *B60Q 9/008* (2013.01); *B60R 1/00* (2013.01); *G06K 9/00805* (2013.01); *B60R 2300/307* (2013.01); *B60R 2300/8093* (2013.01)

(58) Field of Classification Search
CPC ............... B60R 1/00; B60R 2300/307; B60R 2300/8093; G06K 9/00805; B60Q 9/008
USPC .................................................. 340/435–440
See application file for complete search history.

(56) References Cited

U.S. PATENT DOCUMENTS

2005/0231341 A1* 10/2005 Shimizu ................. B60Q 9/005
340/436

FOREIGN PATENT DOCUMENTS

| JP | 2010287015 A | 12/2010 |
| JP | 2013020543 A | 1/2013 |

\* cited by examiner

*Primary Examiner* — Joseph H Feild
*Assistant Examiner* — Sharmin Akhter
(74) *Attorney, Agent, or Firm* — Hunton Andrews Kurth LLP

(57) ABSTRACT

A periphery image display control device displays an image of a periphery area photographed by a camera sensor 21, and predicts a travel path area which a vehicle-body of the own vehicle will pass through along a predicted travel path. The device detects locations of obstacle points and heights of the obstacle points. The heights of the obstacle points become higher as the obstacle points are farther from the own vehicle. When a gradient (GR=(YO−YB)/(XO−KB)) being a ratio of "a subtraction value obtained by subtracting a height of a first obstacle point which is nearer from the own vehicle from a height of a second obstacle point which is farther from the own vehicle" to "a distance between the two obstacle points along the predicted travel path" is greater than a threshold gradient GRth, the device displays an alert screen for the second obstacle point.

3 Claims, 6 Drawing Sheets

PERIPHERY IMAGE DISPLAY CONTROL DEVICE

CROSS-REFERENCE TO RELATED APPLICATION

The present application claims priority to Japanese Patent Application No. 2017-131119 filed on Jul. 4, 2017, which is incorporated herein by reference in its entirety.

BACKGROUND

Technical Field

The present disclosure relates to a periphery image display control unit for displaying an image of a periphery area around an own vehicle which is photographed by a camera, to display an alert image regarding an obstacle in a travel path area of the own vehicle.

Related Art

Hitherto, for example, as proposed in Japanese Patent Application Laid-open No. 2013-20543, a device (hereinafter referred to as a "conventional device") displays an alert image to have a driver of a golf cart to pay attention to an obstacle which is present in a travel path of the golf cart, when the conventional device detects the obstacle. The conventional device identifies the travel path based on an image photographed by an infrared camera.

Further, the conventional device measures 3D coordinates of each of points in the travel path based on an image photographed by a stereo camera system so as to calculate a gradient ($\theta=\Delta Y/\Delta Z$) of a height direction (Y) to a depth direction (Z) or a gradient change ($\Delta\theta$). When the gradient ($\theta$) is greater than a predetermined threshold ($\beta$), or when the gradient change ($\Delta\theta$) is greater than a predetermined threshold ($\gamma$), the conventional device determines that the obstacle is present.

SUMMARY

The conventional device is designed to be applied to a golf cart. In such a golf cart, a distance/height between a bottom end of a golf cart's body and a ground plane is short/low. Therefore, the conventional device determines whether or not there is the obstacle, under an assumption that the golf cart cannot travel (run, go) over even a small obstacle. If the conventional device is applied to a "vehicle whose distance/height between the bottom end and the ground plane is longer than the distance/height of the golf cart, for example, the vehicle for off-load", the conventional device is likely to display the alert image for the obstacle that the vehicle can travel (run, go) over. Such an unnecessary alert image is likely to annoy the driver.

The present disclosure has been made to solve the problem described above. The present disclosure has an object to provide a periphery image display control device that can reduce a "possibility of displaying the unnecessary alert image regarding the obstacle that the vehicle can travel over" to thereby reduce a possibility that the alert image annoys the driver.

A periphery image display control device (hereinafter, referred to as "present disclosure device") according to the present disclosure comprises a display control unit (10) for displaying an image photographed by a camera (11) which photographs a periphery area around an own vehicle on a display unit (30).

Further, the present disclosure device comprises:
a prediction unit (10, Step 515, Step 520) for predicting a travel path area (ECA) which a vehicle-body of the own vehicle will pass through when the own vehicle travels along a predicted travel path (RCR);

an obstacle detection unit (11, 10, Step 610) for obtaining obstacle information including locations of obstacle points which are included in at least one of obstacles present in the travel path area and whose heights become higher as the obstacle points are farther from the own vehicle, and heights of the obstacle points in relation to the own vehicle; and a determination unit (10, Step 655, Step 660) configured to:
determine whether or not a first ratio (a gradient GR= (YO−YB) (XO−XB)) is greater than a threshold (a threshold gradient GRth=Yth/Xth), the first ratio being a ratio of a subtraction value (YO−YB) obtained by subtracting a height of a first obstacle point which is nearer from the own vehicle between two of the obstacle points which are adjacent to each other in a direction of the predicted travel path from a height of a second obstacle point which is farther from the own vehicle between the two of the obstacle points, to a distance (XO−XB) between the first obstacle point and the second obstacle point along the predicted travel path, and the threshold being a value which is preset based on a second ratio of a height (Yth) between a ground point (CA) of a front wheel of the own vehicle and a bottom end (FB) at a front end of the vehicle-body of the own vehicle to a distance (Xth) between the front end and the ground point in a horizontal direction of the vehicle-body; and determine that the obstacle including the second obstacle point is an alert obstacle (Step 655, Step 660), when the first ratio is determined to be greater than the threshold ("Yes" at Step 645).

Further, the display control unit is configured to display an alert screen for causing the driver to pay attention to the alert obstacle on the display unit (Step 550).

Thus, the present disclosure device can detect/find, as the alert obstacle (the alert obstacle to cause an alert), the obstacle which the own vehicle may not be able to travel (run, go) over, and can reduce the possibility that the control device misdetects (erroneously detect) the obstacle which the own vehicle can travel (run, go) over as the alert obstacle. Therefore, the present disclosure device can reduce the possibility that the alert image annoys a driver.

One embodiment of the present disclosure resides in that the determination unit is configured to have a display mode for the alert obstacle whose subtraction value is greater than the height (Yth) between the ground point and the bottom end ("Yes" at Step 650) different from a display mode for the alert obstacle whose subtraction value is equal to or smaller than the height between the ground point and the bottom end ("No" at Step 650) (refer to an obstacle A illustrated in FIG. 3A and an obstacle B illustrated in FIG. 3B).

The own vehicle SV cannot travel (run, go) over the alert obstacle (a first alert obstacle) whose subtraction value is greater than the height between the ground point and the bottom end so that a vehicle-body of the own vehicle SV is likely to collide/contact with that alert obstacle. On the other hand, the own vehicle SV may or may not be able to travel (run, go) over the alert obstacle (a second alert obstacle) whose subtraction value is equal to or smaller than the height between the ground point and the bottom end, depending on an angle between the own vehicle SV and the ground when front wheels of the own vehicle SV has just climbed up the obstacle which is nearer from the own vehicle SV than the alert obstacle and is adjacent to the alert obstacle along the predicted travel path. The embodiment of the present disclosure device has/makes the display mode for the first alert obstacle different from the display mode for the second alert obstacle. Therefore, the embodiment allows the driver to easily determine/recognize whether or not the alert obstacle is the first alert obstacle which the vehicle-body of the own vehicle SV is likely to collide/contact with because the own vehicle SV is unlikely to travel (run, go) over the obstacle, and allows the driver to easily determine/recognize whether or not the alert obstacle is the second alert obstacle which the own vehicle SV may be able to travel (run, go) over.

In one embodiment of the present disclosure, the obstacle detection unit is configured to obtain expanded area information including a location of an expanded area obstacle point which is included in the obstacle present in an expanded area (ECA') and a height of the expanded area obstacle point, the expanded area being an area obtained by expanding a left end of the travel path area to a left direction in a width direction of the own vehicle (LCE') and by expanding a right end of the travel path area to a right direction in the width direction of the own vehicle (RCE'), and the determination unit is configured to:

determine whether or not there is the expanded obstacle point whose height is higher than the height (Yth) between the ground point and the bottom end based on the expanded area information; and determine that the obstacle including the expanded area obstacle point is the alert obstacle (refer to an obstacle C illustrated in FIG. 7), when there is the expanded area obstacle point whose height is higher than the height (Yth) between the ground point and the bottom end.

Thus, the embodiment allows the driver to easily find the obstacle which is likely to collide/contact with the side of the own vehicle SV when the own vehicle SV turns.

In the above description, in order to facilitate the understanding of the disclosure, reference symbols used in embodiment of the present disclosure are enclosed in parentheses and are assigned to each of the constituent features of the disclosure corresponding to the embodiment. However, each of the constituent features of the disclosure is not limited to the embodiment as defined by the reference symbols.

DETAILED DESCRIPTION

Figure 1:
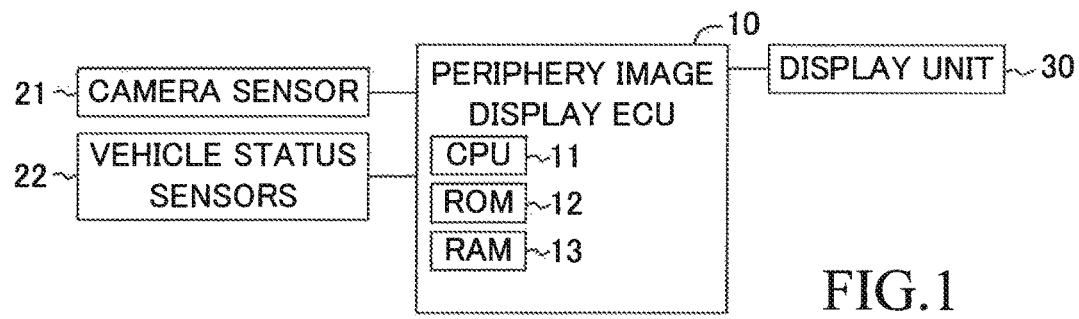
FIG. 1 is a schematic system configuration diagram of a periphery image display control device (a control device) according to an embodiment of the present disclosure.

A periphery image display control device (hereinafter referred to as a "control device") according to an embodiment of the present disclosure will next be described with reference to the accompanying drawings. A vehicle in which the control device is installed is referred to as an "own vehicle SV", when this vehicle needs to be distinguished from other vehicles. The control device detects an obstacle that the own vehicle SV cannot (is unlikely to be able to) travel (run, go) over based on an image photographed by a camera sensor 21 shown in FIG. 1, to display an alert image to have/make the driver pay attention to the obstacle.

The control device includes a periphery image display ECU 10. It should be noted that an ECU is an abbreviation of an "Electronic Control Unit" which includes a microcomputer as a main part. The microcomputer includes a CPU 11, and memories (for example, a ROM 12, a RAM 13, and the like). The CPU 11 achieves various functions through executing instructions (program, routine) stored in the ROM 12.

The control device further includes a camera sensor 21, vehicle state sensors 22, and a display unit 30. They are connected with the periphery image display ECU 10.

The camera sensor 21 includes a vehicle-installed/on-board stereo camera device (not shown) which photographs an area ahead of the own vehicle, and an image processing device (not shown) which processes the image photographed by the vehicle-installed stereo camera device.

Figure 2:
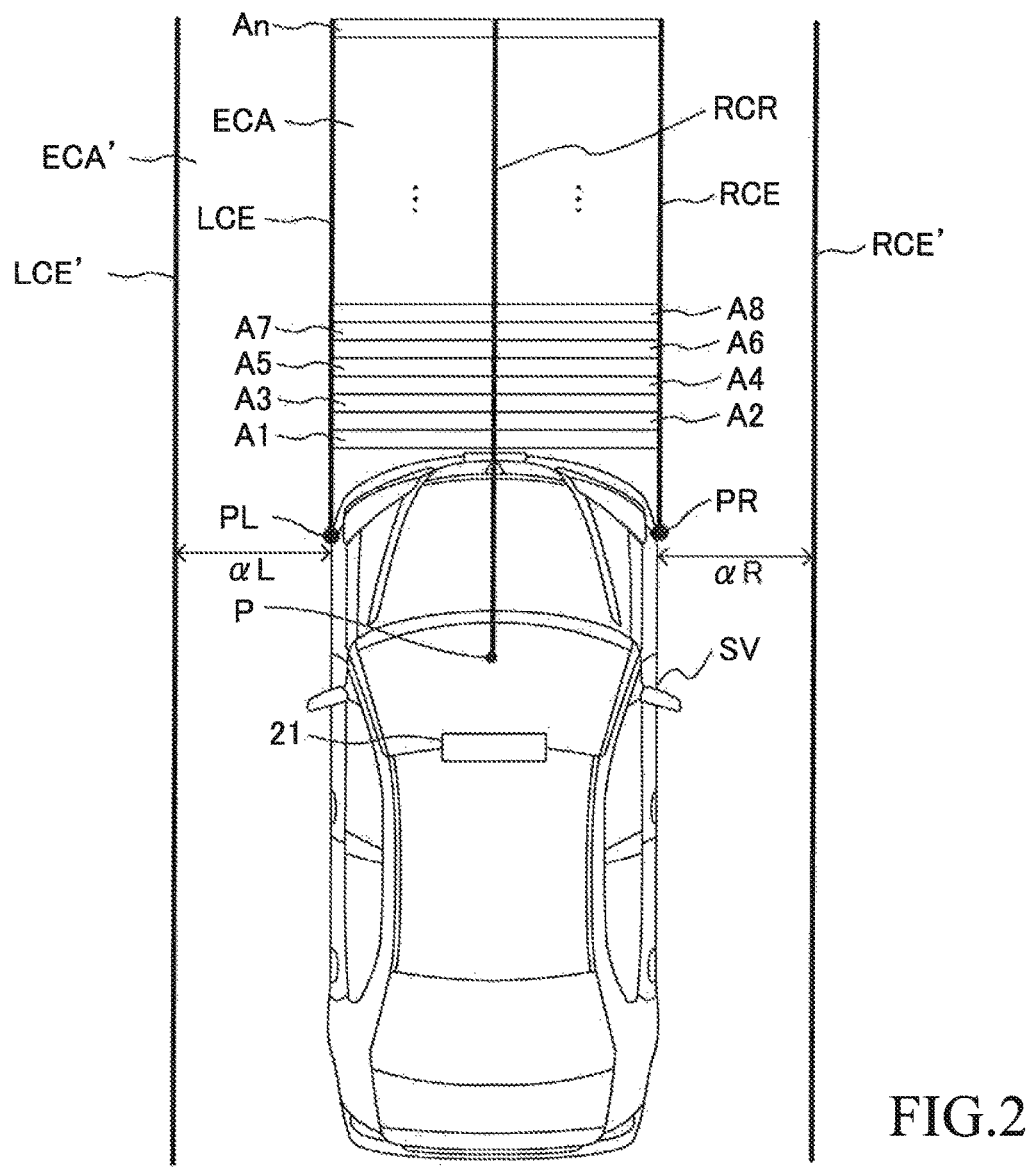
FIG. 2 is a top view diagram illustrating a predicted travel path and a travel path area.

The vehicle-installed stereo camera device is arranged in the vicinity of the center in a width direction of a front end of a roof of the own vehicle SV (refer to a location of the camera sensor 21 illustrated in FIG. 2). The vehicle-installed stereo camera device includes a left camera arranged in a left side of a vehicle longitudinal axis and a right camera arranged in a right side of the vehicle longitudinal axis. The left camera photographs the area ahead of the own vehicle SV, and transmits a left image signal representing a left image photographed by the left camera to the image processing device, every time a predetermined time period elapses. Similarly, the right camera photographs the area ahead of the own vehicle SV, and transmits a right image signal representing a right image photographed by the right camera to the image processing device, every time the predetermined time period elapses.

The image processing device detects/extracts a feature point(s) from the left image represented by the received left image signal, and detects/extracts a feature point(s) from the right image represented by the received right image signal. The feature point is extracted/detected using a well-known method such as Harris, Features from Accelerated Segment Test (FAST), Speeded Up Robust Features (SURF), Scale-Invariant Feature Transform (SIFT), or the like.

Thereafter, the image processing unit associates one of the feature points extracted from the left image with one of the feature points extracted from the right image so as to calculate a distance between the corresponding/associated feature point and the own vehicle SV and a direction of the corresponding feature point in relation to the own vehicle SV, using a parallax between those feature points. The location of the corresponding feature point in a horizontal coordinate with the origin located at the center of a front end of the own vehicle SV is identified based on the distance between the corresponding feature point and the own vehicle SV and the direction of the corresponding feature point in relation to the own vehicle SV.

Further, the image processing device calculates a height of the feature point based on the left image and the right image. The height of the feature point is a height in relation to the own vehicle SV. The image processing device calculates the height of the feature point based on the above distance between the feature point and the own vehicle SV, an elevation/depression angle from the vehicle-installed stereo camera device to the feature point, and a height of the vehicle-installed stereo camera device in relation to a ground point of the own vehicle SV.

Further, the image processing device transmits obstacle information, and camera image information including the left image and the right image to the periphery image display ECU 10, every time a predetermined time period elapses. The obstacle information includes the distance between the own vehicle and the feature point, the direction of the feature point in relation to the own vehicle SV, and the height of the feature point.

The vehicle state sensors 22 include sensors for obtaining vehicle state information on a travel state of the own vehicle SV, which is necessary to predict a predicted travel path (course, trajectory) RCR (refer to FIG. 2) of the own vehicle SV. The vehicle state sensors 22 include a vehicle velocity sensor for detecting velocity (speed) of the own vehicle SV, an acceleration sensor for detecting an acceleration of the own vehicle SV in a longitudinal direction on an horizontal plane and an acceleration of the own vehicle SV in a width direction (a crosswise direction) on the horizontal plane, a yaw rate sensor for detecting a yaw rate of the own vehicle SV, a steering angle sensor for detecting a steering angle of steered wheels, and the like. The vehicle state sensors 22 transmit the vehicle state information to the periphery image display ECU 10 every time a predetermined time period elapses.

The periphery image display ECU 10 calculates a turning radius of the own vehicle SV based on the velocity of the own vehicle SV detected by the vehicle velocity sensor, and the steering angle detected by the steering angle sensor. Thereafter, the periphery image display ECU 10 predicts, as the predicted travel path (course, trajectory) RCR (refer to FIG. 2), a travel path (course, trajectory) along which the center point in the width direction of the own vehicle SV (the center point P (refer to FIG. 2) of a wheel axis connecting a left front wheel and a right front wheel) will move, based on the turning radius. The periphery image display ECU 10 recognizes (determines), as the predicted travel path RCR, a part of the travel path having a finite distance from a present location of the own vehicle SV to a location where the own vehicle SV will move for a predetermined distance/length from the present location along the travel path, regardless of whether the own vehicle SV is traveling straight or the own vehicle SV is turning. Further, the periphery image display ECU 10 may calculate the turning radius based on the velocity of the own vehicle SV and the yaw rate of the own vehicle SV.

Figure 3A:
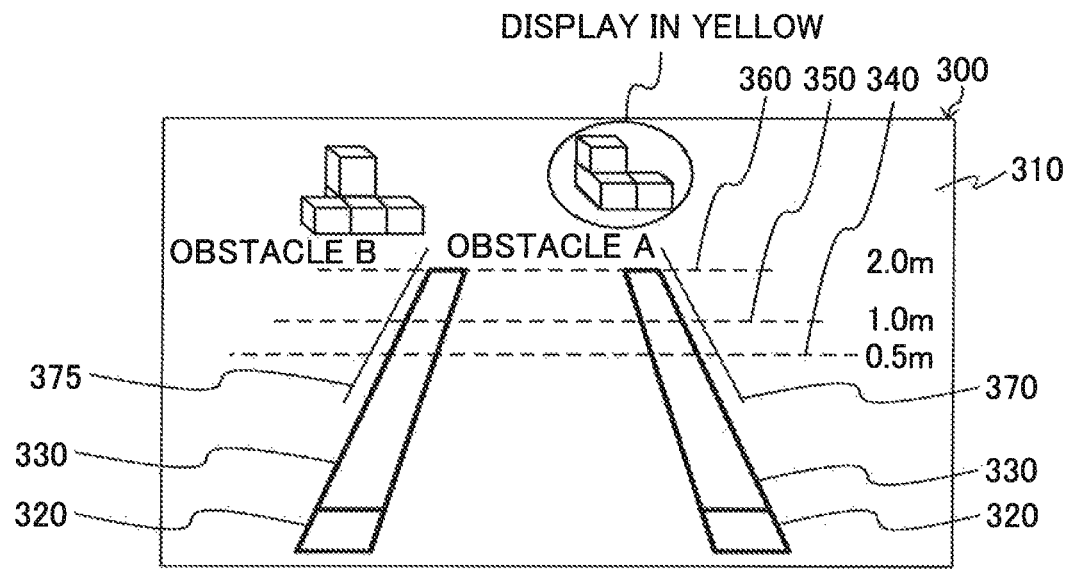
FIG. 3A is an explanatory diagram illustrating a periphery screen when an own vehicle travels straight.
Figure 3B:
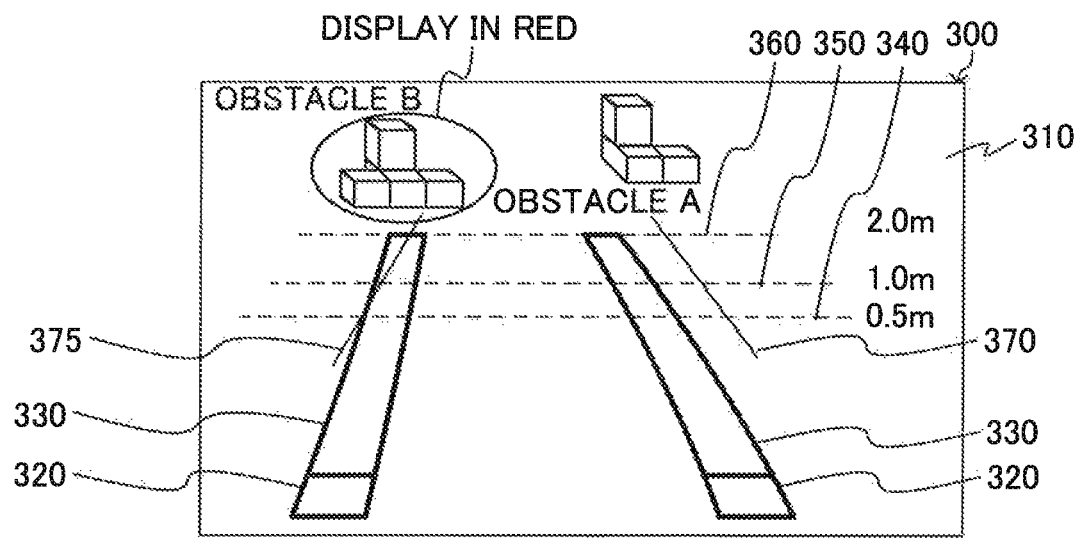
FIG. 3B is an explanatory diagram illustrating the periphery screen when the own vehicle turns left.

The display unit 30 is arranged in an instrument panel (not shown) inside the own vehicle SV. As illustrated in FIGS. 3A and 3B, a periphery screen 300 is displayed on the display unit 30. The periphery screen 300 includes a camera image display area 310 on which the image (a camera image) photographed by the camera sensor 21 is displayed. Two present ground areas 320, two predicted ground areas 330, a "0.5 m" line segment 340, a "1.0 m" line segment 350, a "2.0 m" line segment 360, a right side (surface) displaying line segment 370, and a left side (surface) displaying line segment 375 are superimposed on the camera image displayed on the camera image display area 310.

One of the present ground areas 320 is superimposed on an image area in the camera image corresponding to an area where the left front wheel of the own vehicle SV is grounded. The other is superimposed on an image area in the camera image corresponding to an area where the right front wheel of the own vehicle SV is grounded. One of the predicted ground areas 330 is superimposed on an image area in the camera image corresponding to an area where the left front wheel of the own vehicle SU is predicted to be grounded. The other is superimposed on an image area in the camera image corresponding to an area where the right front wheel of the own vehicle SV is predicted to be grounded.

"The image area in the camera image which each of the predicted ground areas 330 is superimposed on" is identified based on the predicted travel path RCR of the own vehicle SV. In FIG. 3A, "the image area in the camera image which each of the predicted ground areas 330 is superimposed on" is identified based on the predicted travel path RCR when the own vehicle SV travels straight. In contrast, in FIG. 3B, "the image area in the camera image which each of the predicted ground areas 330 is superimposed on" is identified based on the predicted travel path RCR when the own vehicle SV is steered. Thus, the predicted ground areas 330 illustrated in FIG. 3B curve to a left direction as compared with the predicted ground areas 330 illustrated in FIG. 3A.

The "0.5 m" line segment 340 is superimposed on an image area in the camera image corresponding to an area "0.5 m" ahead of the front end of the own vehicle SV. The "1.0 m" line segment 350 is superimposed on an image area in the camera image corresponding to an area "1.0 m" ahead of the front end of the own vehicle SV. The "2.0 m" line segment 360 is superimposed on an image area in the camera image corresponding to an area "2.0 m" ahead of the front end of the own vehicle SV.

The right side surface displaying line segment 370 is superimposed on "an image area in the camera image corresponding to an area which the right side of the front side of the vehicle-body of the own vehicle SV will pass through under an assumption that the own vehicle SV travels straight". The left side surface displaying line segment 375 is superimposed on "an image area in the camera image corresponding to an area which the left side of the front side of the vehicle-body of the own vehicle SU will pass through under the assumption that the own vehicle SV travels straight".

<Outline of Operation>

An operation of the control device will next be described. The control device highlights (displays the alert image of) an image area in the camera image displayed in the camera image display area 310 corresponding to an alert obstacle so as to have the driver pay attention to the alert obstacle. The alert obstacle is an obstacle which the own vehicle SV cannot (is unlikely to be able to) travel (run, go) over (override). In other words, the alert obstacle is an obstacle which is likely to collide/contact with the vehicle-body of the own vehicle SV.

The control device predicts a travel path area ECA (refer to FIG. 2) which the vehicle-body of the own vehicle SV passes through, based on the predicted travel path RCR. A detail of a prediction process of the travel path area ECA is described. As described above, the control device predicts the travel path along which the center point (refer to the point O) of the wheel axis connecting the left front wheel and the right front wheel will move as the predicted travel path RCR. Further, the control device predicts, based on the "part of the predicted travel path RCR having the finite distance", a predicted left travel path LEC which a point PL at a left end of the vehicle-body of the own vehicle SV will pass through, and a predicted right travel path REC which a point PR at a right end of the vehicle-body of the own vehicle SV will pass through. The predicted left travel path LEC is obtained by parallelly shifting the predicted travel path RCR to the left direction of the own vehicle SV by a half of a vehicle-body width. The predicted right travel path REC is obtained by parallelly shifting the predicted travel path RCR to the right direction of the own vehicle SV by the half of the vehicle-body width. Further, the control device predicts/specifies, as the travel path area ECA, an area between the predicted left travel path LEC and the predicted right travel path REC.

Subsequently, the control device divides the travel path area ECA into a plurality of areas Am along the predicted travel path RCR. It should be noted that a suffix "m" is one of natural numbers from "1" to "n". Each of the areas Am has a predetermined length along the predicted travel path RCR. Thereafter, the control device identifies/selects the feature point whose height (Y) is the highest among the feature points which are present in each of the areas Am as a provisional highest point PPm. In the area where there is no feature point, the control device finds no provisional highest point. Hereinafter, for the purpose of illustration, the provisional highest point PP1, the provisional highest point PP2 • • • the provisional highest point PPn are defined in the order of closer distance from the own vehicle SV along the predicted travel path RCR. That is, as the provisional highest point is farther from the own vehicle SV along the predicted travel path RCR, the value of the suffix "m" of the provisional highest point PPm is greater.

The control device identifies/selects the provisional highest point(s) PPm which satisfies the following condition A among the identified provisional highest points PPm, as a highest point HPm. The highest point HPm may be referred to as an "obstacle point". Similarly to the provisional highest point PPm, as the highest point HPm is farther from the own vehicle SV along the predicted travel path RCR, the value of the suffix "m" of the highest point HPm is greater.

Condition A: The height (Ym) of the provisional highest point PPm>The height (Ym−1) of the provisional highest point PPm−1 (That is, the height Ym is greater than the height Ym−1)

It should be noted that the control device automatically identifies the provisional highest point PP1 which is the nearest from the own vehicle SV among the identified provisional highest points PPm, as the highest point HP1 (regardless of the condition A above).

Subsequently, the control device calculates a gradient GR between heights (Y) of two highest points HPm which are adjacent to each other along the direction of the predicted travel path RCR. A calculation process for the gradient GR is described with reference to FIG. 4. In FIG. 4, six highest points HP1 through HP6 have been identified. The highest point HP1 is the nearest from the own vehicle SU along the predicted travel path RCR. The highest point HP6 is the farthest from the own vehicle SV along the predicted travel path RCR.

The control device selects the highest point HP1 as a base point BP so as to determine whether or not the height (Y1) of the highest point HP1 selected as the base point BP is equal to or lower than a threshold height Yth. The threshold height Yth has been set in advance to a distance/height (a minimum road clearance of the own vehicle SV) between a bottom end FB (refer to FIG. 4A) of the front end of the vehicle-body of the own vehicle SV and the horizontal plane including ground points CA (refer to FIG. 4A) of the right front wheel and the left front wheel.

When the height Y1 of the highest point HP1 is equal to or lower than the threshold height Yth, it is considered that the own vehicle SV can travel (run, go) over the obstacle (a simplex obstacle) including the highest point HP1. Therefore, the control device does not determine that the obstacle including the highest point HP1 is the alert obstacle. In other words, the control device determines that the obstacle including the highest point HP1 is an obstacle whose danger degree DD is "0". It should be noted that a detail of the danger degree DD is described later.

On the other hand, when the height Y1 of the highest point HP1 is higher than the threshold height Yth, the vehicle-body (the bottom end FB of the vehicle-body) of the own vehicle SV is likely to collide/contact with the obstacle including the highest point HP1 so that the own vehicle SV cannot travel (run, go) over the obstacle including the highest point HP1. Therefore, the control device determines that the obstacle including the highest point HP1 is the alert obstacle. In other words, the control device determines that the obstacle including the highest point HP1 is an obstacle whose danger degree DD is "2".

Subsequently, the control device selects, as an object point OP, the highest point HP2 which is the nearest from the own vehicle SV among the highest points HPm except the base point BP (the highest point HP1). Thereafter, the control device determines whether or not a height YO (Y2) of the object point OP (the highest point HP2) is higher than the threshold height Yth.

When the height YO of the object point OP is equal to or lower than the threshold height Yth, it is considered that the own vehicle SV can travel (run, go) over the obstacle including the object point OP. Therefore, the control device does not determine that the obstacle including the object point OP is the alert obstacle. In other words, the control device determines that the obstacle including the object point OP is the obstacle whose danger degree DD is "0".

When the height YO of the object point OP is higher than the threshold height Yth, the control device calculates the gradient GR of the object point OP in accordance with an expression 1.

$$GR=(YO-YB)/(XO-XB) \qquad \text{(expression 1)}$$

The "YO" of the expression 1 represents the height of the object point OP. The "YB" of the expression 1 represents the height of the base point BP. Further, the "XO" of the expression 1 represents a distance between the object point OP and the own vehicle SV (the front end of the vehicle-body) along the predicted travel path RCR. The "XB" of the expression 1 represents a distance between the base point BP and the own vehicle SV (the front end of the vehicle-body) along the predicted travel path RCR.

Thereafter, the control device determines whether or not the gradient GR is greater than a threshold gradient GRth. The threshold gradient GRth has been set to a value which has been calculated in accordance with an expression 2 in advance.

$$GRth=Yth/Xth \qquad \text{(expression 2)}$$

The "Yth" of the expression 2 represents the above threshold height Yth. The "Xth" of the expression 2 represents a "distance between the ground points CA of the right front wheel and the left front wheel and the front end of the vehicle-body of the own vehicle SV" in a horizontal direction. In other words, this "Xth" represents a front overhang length.

When the gradient GR is equal to or smaller than the threshold gradient GRth, even if the height YO of the object point OP is higher than the threshold height Yth, the own vehicle SV can travel (run, go) over this object point OP, because the own vehicle SV travels/runs forward while climbing up the "obstacle which is present at a position closer to the own vehicle SV than the object point OP which is the obstacle including the base point BP". Therefore, the control device does not determine that the object point OP is the alert obstacle. In other words, the control device determines that the obstacle including the object point OP is the obstacle whose danger degree DD is "0".

Figure 4A:
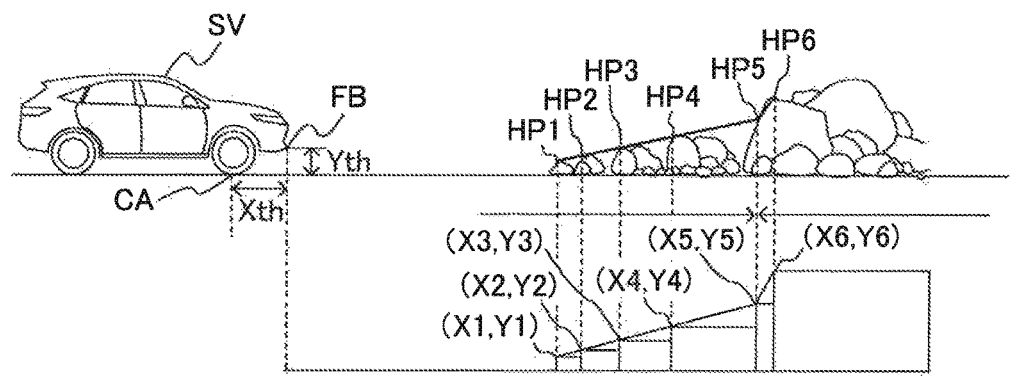
FIG. 4A is an explanatory diagram illustrating an outline of the present disclosure.
Figure 4B:
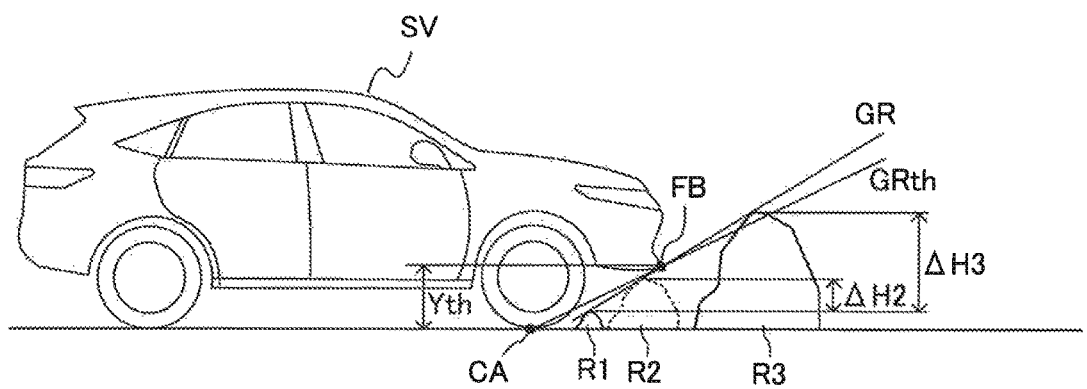
FIG. 4B is another explanatory diagram illustrating the outline of the present disclosure.

On the other hand, as illustrated in FIG. 4B, when the own vehicle SV is about to run over (climb up) the object point OP whose the gradient GR is greater than the threshold gradient GRth, the vehicle-body of the own vehicle SV may (or is likely to) collide/contact with the obstacle including the object point OP. In view of this, the control device calculates a height subtraction value ($\Delta H$) through subtracting the height YB of the base point BP from the height YO of the object point OP, in order to determine whether the obstacle including the object point OP is the "obstacle which the vehicle-body of the own vehicle SV is very likely to collide/contact with" or "the obstacle which the own vehicle SV may be able to travel (run, go) over depending on the situation".

For instance, as shown in FIG. 4B, if the obstacle including the base point BP is a rock R1 and the obstacle including the object point OP is a rock R2, the height subtraction value $\Delta H$ is "$\Delta H2$", On the other hand, if the obstacle including the base point BP is the rock R1 and the obstacle including the object point OP is a rock R3, the height subtraction value $\Delta H$ is "$\Delta H3$", while assuming that the rock R2 is not present.

Thereafter, the control device determines whether or not the height subtraction value $\Delta H$ is greater than the threshold height Yth.

In a case where the height subtraction value $\Delta H$ (=$\Delta H3$) is greater than the threshold height Yth such as the case where the obstacle including the base point BP is the rock R1 and the obstacle including the object point OP is the rock R3, the vehicle-body of the own vehicle SV collides/contacts with the obstacle including the object point OP when the own vehicle SV is going/about to run/go on the object point OP. Therefore, the control device determines that the obstacle including the object point OP is the alert obstacle. In other words, the control device determines that the obstacle including the object point OP is the obstacle whose danger degree DD is "2".

On the other hand, when the height subtraction value $\Delta H$ (=$\Delta H2$) is equal to or smaller than the threshold height Yth such as the case where the obstacle including the base point BP is the rock R1 and the obstacle including the object point OP is the rock R2, though the gradient GR is greater than the threshold gradient GRth, the own vehicle SV may be able to travel (run, go) over the object point OP, depending on an angle formed between the own vehicle SV and the ground when the front wheels of the own vehicle SV has climbed up the base point BP. In other words, the own vehicle SV may be unable to travel (run, go) over the object point OP, depending on the angle formed between the own vehicle SU and the ground when the front wheels of the own vehicle SV has climbed up the base point BP. The control device determines that the obstacle including this type of the obstacle point OP is the alert obstacle.

A "possibility that the own vehicle SV cannot travel (run, go) over the obstacle point OP (i.e., the rock R3) whose the height subtraction value $\Delta H$ is greater than the threshold height Yth" is higher than a "possibility that the own vehicle SV cannot travel (run, go) over the obstacle point OP (i.e., the rock R2) whose the height subtraction value $\Delta H$ is equal to or smaller than the threshold height Yth". Therefore, "the danger degree DD of the obstacle point OP whose the height subtraction value $\Delta H$ is greater than the threshold height Yth" is greater than "the danger degree DD of the obstacle point OP whose the height subtraction value $\Delta H$ is equal to or smaller than the threshold height Yth". In view of the above, the control device determines that the "danger degree DD of the obstacle point OP whose the height subtraction value $\Delta H$ is greater than the threshold height Yth" is "2", and the "danger degree DD of the obstacle point OP whose the height subtraction value $\Delta H$ is equal to or smaller than the threshold height Yth" is "1".

Here, an additional explanation of an operation of the control device is described with reference to an example illustrated in FIG. 4A. In this example, it is assumed that the following conditions is established.

The heights Y1 through Y3 of the highest points HP1 through HP3 are equal to or lower than the threshold height Yth.

The heights Y4 through Y6 of the highest points HP4 through HP6 are higher than the threshold height Yth.

Both the gradient GR between the highest point HP1 and the highest point HP2 and the gradient GR between the highest point HP2 and the highest point HP3 are equal to or smaller than the threshold gradient GRth. Further, both the gradient GR between the highest point HP3 and the highest point HP4 and the gradient GR between the highest point HP4 and the highest point HP5 are equal to or smaller than the threshold gradient GRth.

The gradient GR between the highest point HP5 and the highest point HP6 is greater than the threshold gradient GRth. The height subtraction value $\Delta H$ obtained by subtracting the height Y5 of the highest point HP5 from the height Y6 of the highest point HP6 is greater than the threshold height Yth.

Since the height Y1 of the highest point HP1 selected as the base point BP is equal to or lower than the threshold height Yth, the control device does not determine that the highest point HP1 is the alert obstacle. Subsequently, the control device selects the highest point HP2 as the object point OP. In this case, since the height Y2 of the highest point HP2 is equal to or lower than the threshold height Yth according to the above assumption, the control device does not determine that the highest point HP2 is the alert obstacle. Thereafter, the control device selects the highest point HP2 as the base point BP, and the control device selects the highest point HP3 as the object point OP. In this case, similarly to the highest point HP2, since the height Y3 of the highest point HP3 is equal to or lower than the threshold height Yth according to the above assumption, the control device does not determine that the highest point HP3 is the alert obstacle.

Subsequently, the control device selects the highest point HP3 as the base point BP, and selects the highest point HP4 as the object point OP. Since the height Y4 of the highest point HP4 is higher than the threshold height Yth according to the above assumption, the control device calculates the gradient GR of the highest point HP4. In other words, the control device calculates the gradient GR between the highest point HP3 and the highest point HP4. Since this gradient GR is equal to or smaller than the threshold gradient GRth according to the above assumption, the control device does not determine that the highest point HP4 is the alert obstacle. Similarly, since the gradient GR of the highest point HP5 (that is, the gradient GR between the highest point HP4 and the highest point HP5) is equal to or smaller than the threshold gradient GRth according to the above assumption, the control device does not determine that the highest point HP5 is the alert obstacle.

Subsequently, the control device selects the highest point HP5 as the base point BP, and selects the highest point HP6 as the object point OP. Since the height Y6 of the highest point HP6 is higher than the threshold height Yth according to the above assumption, the control device calculates the gradient GR of the highest point HP6. In other words, the control device calculates the gradient GR between the highest point HP5 and the highest point HP6. The gradient GR of the highest point HP6 is greater than the threshold gradient GRth and the height subtraction value ($\Delta H = Y6 - Y5$) obtained by subtracting the height Y5 of the highest point HP5 from the height Y6 of the highest point HP6 is greater than the threshold height Yth, according to the above assumption. Therefore, the control device determines that the highest point HP6 is the alert obstacle. More specifically, the control device determines that the highest point HP6 is the obstacle whose danger degree DD is "2".

Thereafter, the control device identifies the image area corresponding to the obstacle including the highest point HP6 which has been determined as the obstacle whose danger degree is "2" from a whole area of the camera image. Then, the control device displays the "image area corresponding to the obstacle including the highest point HP6" in red on the camera image display area 310 so as to have the driver pay attention to the obstacle including the highest point HP6.

When there is the obstacle including the highest point which has been determined as the obstacle whose danger degree is "1", the control device displays the image area corresponding to that obstacle in yellow.

As understood from the above example, when a ratio (the gradient GR) of the "height subtraction value between the heights of two highest points which are adjacent to each other in the direction of the predicted travel path" to a "distance between those two highest points along the predicted travel path" is greater than the threshold gradient GRth which is a ratio of the "threshold height Yth representing the minimum road clearance of the own vehicle SV" to the "front overhang length of the own vehicle SV", the control device determines that the obstacle including the highest point which is father from the own vehicle SV between those two highest points is the alert obstacle.

Thus, the control device can detect the obstacle which the own vehicle SV cannot travel (run, go) over as the alert obstacle, and can reduce the possibility that the control device misdetects (erroneously detects) the obstacle which the own vehicle SV can travel (run, go) over as the alert obstacle. Therefore, the control device can reduce the possibility that the alert image annoys the driver.

Further, when the gradient GR is greater than the threshold gradient GRth, the control device make a mode of the alert image of the obstacle whose height subtraction value $\Delta H$ is greater than the threshold height Yth different from a mode of the alert image of the obstacle whose the height subtraction value $\Delta H$ is equal to or smaller than the threshold height Yth. This enables the driver to easily recognize which the obstacle is, the "obstacle with which the vehicle-body of the own vehicle SV is likely to collide/contact and over which the own vehicle SV is unlikely to be able to travel (run, go)" or the "obstacle over which the own vehicle SV may be able to travel".

<Specific Operation>

Figure 5:
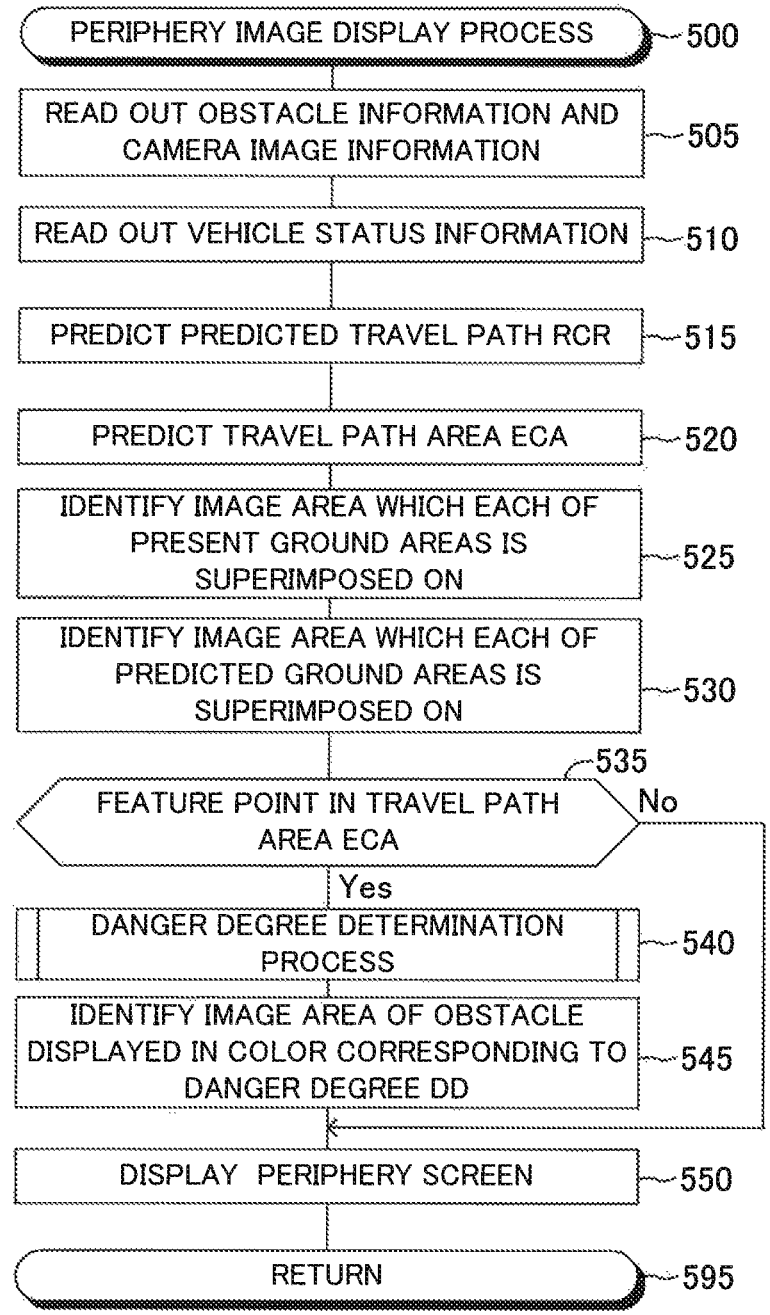
FIG. 5 is a flowchart illustrating a routine which is executed by a CPU of a periphery image display ECU illustrated in FIG. 1.

The CPU 11 of the periphery image display ECU 10 executes a routine represented by a flowchart shown in FIG. 5, every time a predetermined time period elapses. The routine shown in FIG. 5 is a routine for displaying the periphery screen 300 on the display unit 30.

When a predetermined timing has come, the CPU 11 starts the process from Step 500 of FIG. 5, sequentially executes processes of Steps 505 through 530 described below in these order, and proceeds to Step 535.

Step 505: The CPU11 reads out the obstacle information and the camera image information from the image processing device of the camera sensor 21.

Step 510: The CPU 11 reads out the vehicle state information from the vehicle state sensors 22.

Step 515: The CPU 11 predicts the predicted travel path RCR of the own vehicle SV based on the vehicle state information which has been read out at Step 510, in the manner described above.

Step 520: The CPU 11 predicts the travel path area ECA of the own vehicle SV based on the predicted travel path RCR which has been predicted at Step 515, in the manner described above.

Step 525: The CPU 11 identifies the image area in the camera image on which each of the present ground areas 320 is superimposed in the periphery screen 300. More specifically, the CPU 11 identifies a location of a ground plane of the left front wheel and a location of a ground plane of the right front wheel at the present time point, based on the velocity of the own vehicle SV and the steering angel of the steered wheels during a time period from a time point at which this routine was previously executed to the present time point. Thereafter, the CPU 11 selects the camera image which covers (includes) the identified locations from the camera images which have been read out in the past. Further, the CPU 11 identifies the image area corresponding to each of the identified locations from the selected camera image as the image area in the camera image on which each of the present ground area 320 is superimposed.

Step 530: The CPU 11 identifies the image area in the camera image on which each of the predicted ground areas 330 is superimposed. More specifically, the CPU 11 sets the predicted travel path RCR which has been predicted at Step 515 at the center in the width direction of each of the image areas which has been identified at Step 525. Thereafter, the CPU 11 parallelly shifts each of the set predicted travel paths RCR to the left direction by a left predetermined value, and parallelly shifts each of the set predicted travel paths RCR to the right direction by a right predetermined value. The CPU 11 identifies "the image area in the camera image corresponding to an area defined by the one predicted travel path RCR parallelly shifted to the left direction and the one predicted travel path RCR parallelly shifted to the right direction" and "the image area in the camera image corresponding to an area defined by the other predicted travel path RCR parallelly shifted to the left direction and the other predicted travel path RCR parallelly shifted to the right direction", as the image areas in the camera area on which the predicted ground areas 330 are superimposed. It should be noted that the left predetermined value and the right predetermined value have been set such that a total of the left predetermined value and the right predetermined value is equal to a width between the front wheels in advance.

Step 535: The CPU 11 determines whether or not the feature point is present in the travel path area ECA which has been predicted at Step 520 based on the obstacle information which has been read out at Step 505.

When the feature point is present in the travel path area ECA, the CPU 11 makes a "Yes" determination at Step 535, and proceeds to Step 540 to execute a danger degree determination process for determining the danger degree DD of the feature point which is present in the travel path area ECA. In actuality, when the CPU 11 proceeds to Step 540, the CPU 11 executes a subroutine represented by a flowchart shown in FIG. 6.

Figure 6:
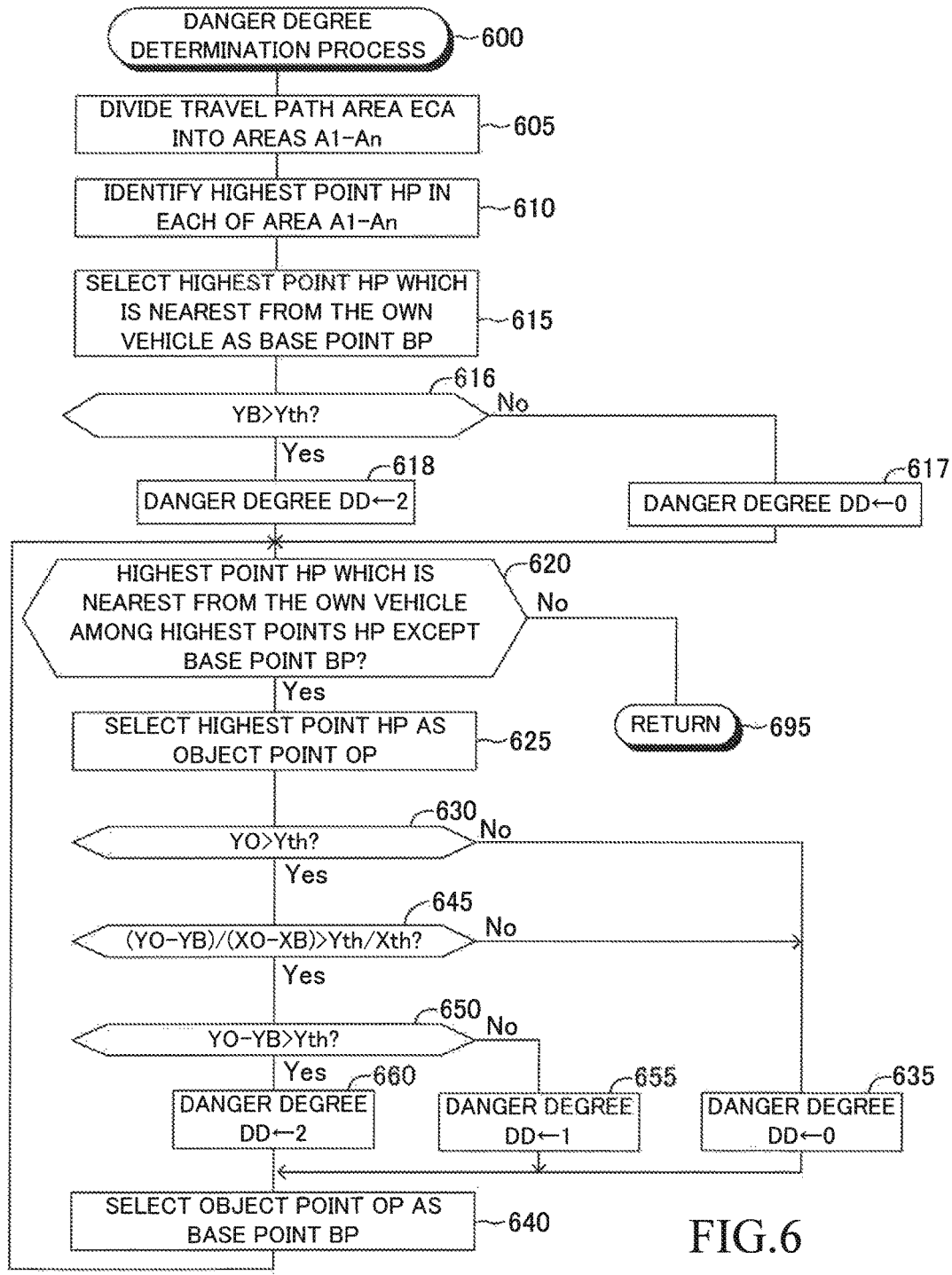
FIG. 6 is a flowchart illustrating a routine which is executed by the CPU of the periphery image display ECU in a danger degree determination process included in the routine illustrated in FIG. 5.

Specifically, when the CPU 11 proceeds to Step 540, the CPU 11 starts the process from Step 600 shown in FIG. 6 to proceed to Step 605. At Step 605, the CPU 11 divides the travel path area ECA into the plurality of areas A1 through An along the predicted travel path RCR, in the manner described above, and proceeds to Step 610.

At Step 610, the CPU 11 identifies the provisional highest point PP in each of the areas A1 through An in the manner described above, and identifies the provisional point PP as the highest point HP when that provisional point PP satisfies the above condition A. Thereafter, the CPU 11 proceeds to Step 615 to select the highest point HP which is the nearest from the own vehicle SV as the base point BP, and proceeds to Step 616.

At Step 616, the CPU 11 determines whether or not the height YB of the highest point HP which has been selected as the base point BP at Step 615 is higher/greater than the threshold height Yth. When the height YB is equal to or lower/smaller than the threshold height YBth, the CPU 11 makes a "No" determination at Step 616 to proceed to Step 617. In this case, the own vehicle SV can travel (run, go) over the base point BP. Thus, at Step 617, the CPU 11 determines that the danger degree DD of the base point BP is "0", in other words, that the base point BP is not the obstacle, to store information representing that into the RAM 13. Thereafter, the CPU 11 proceeds to Step 620.

On the other hand, when the height YB is higher/greater than the threshold height Yth, the CPU 11 makes a "Yes" determination at Step 616, and proceeds to Step 618. In this case, the own vehicle SV cannot travel (run, go) over the base point BP. Thus, at Step 618, the CPU 11 determines that the danger degree DD of the base point BP is "2", in other words, that the base point BP is the obstacle whose danger degree DD is "2", to store information representing that into the RAM 13. Thereafter, the CPU 11 proceeds to Step 620.

At Step 620, the CPU 11 determines whether or not there is the highest point HP which is the nearest from the own vehicle SV along the predicted travel path RCR among the highest points except the base point BP. When there is the highest point HP which is the nearest from the own vehicle SV along the predicted travel path RCR among the highest points except the base point BP, the CPU 11 makes a "Yes" determination at Step 620, and proceeds to Step 625.

At Step 625, the CPU 11 selects, as the object point OP, the highest point HP which is the nearest from the own vehicle SV along the predicted travel path RCR among the highest points except the base point BP, and proceeds to Step 630. At Step 630, the CPU 11 determines whether or not the height YO of the object point OP is higher than the above threshold height Yth.

When the height YO of the object point OP is equal to or lower than the threshold height Yth, the CPU 11 makes a "No" determination at Step 630, and proceeds to Step 635.

At Step 635, the CPU 11 determines that the danger degree DD of the object point OP is "0", in other words, that the object point OP is not the obstacle, to store information representing that into the RAM 13, and proceeds to Step 640.

At Step 640, the CPU 11 selects, as the base point BP, the object point OP which has been selected at Step 625 to return to Step 620.

When the height YO of the object point OP is higher than the threshold height Yth at a time point at which the CPU 11 executes the process of Step 630, the CPU 11 makes a "Yes" determination at Step 630, and proceeds to Step 645.

At Step 645, the CPU 11 calculates the gradient GR of the object point OP in accordance with the expression 1 in the manner described above to determine whether or not the calculated gradient GR of the object point OP is greater than the threshold gradient GRth.

When the gradient GR of the object point OP is equal to or smaller than the threshold gradient GRth, the CPU 11 makes a "No" determination at Step 645, and proceeds to Step 635. At Step 635, the CPU 11 determines that the danger degree DD of the object point OP is "0", to store information representing that into the RAM 13. Thereafter, the CPU 11 proceeds to Step 640.

On the other hand, when the gradient GR of the object point OP is greater than the threshold gradient GRth, the CPU 11 makes a "Yes" determination at Step 645, and proceeds to Step 650. At Step 650, the CPU 11 determines whether or not the height subtraction value (ΔH=YO−YB) obtained by subtracting the height YB of the base point YB of the base point BP from the height YO of the object point OP is greater than the threshold height Yth.

When the height subtraction value ΔH is equal to or smaller than the threshold height Yth, the CPU 11 makes a "No" determination at Step 650, and proceeds to Step 655. At Step 655, the CPU 11 determines that the danger degree DD of the object point OP is "1", in other words, that the object point OP is the obstacle whose danger degree DD is "1", to store information representing that into the RAM 13. Thereafter, the CPU 11 proceeds to Step 640.

On the other hand, when the height subtraction value ΔH is greater than the threshold height Yth, the CPU 11 makes a "Yes" determination at Step 625, and proceeds to Step 660. At Step 660, the CPU 11 determines that the danger degree DD of the object point OP is "2", in other words, that the object point OP is the obstacle whose danger degree DD is "2", to store information representing that into the RAM 13. Thereafter, the CPU 11 proceeds to Step 640.

Further, when there is no highest point HP which is the nearest from the own vehicle SV along the predicted travel path RCR among the highest points except the base point BP at the time point at which the CPU 11 executes the process of Step 620, the CPU 11 makes a "No" determination at Step 620 to proceed to Step 695, at which the CPU 11 tentatively terminates the present routine, and proceeds to Step 545 shown in FIG. 5.

At Step 545, the CPU 11 reads out the information on the obstacle whose danger degree DD has been determined to be "2" or "1" at Step 540 from the RAM 13. Thereafter, the CPU 11 identifies the "image area to be displayed in a color (i.e., red or yellow) corresponding to the danger degree DD of the obstacle" in the camera image, and proceeds to Step 550. The image area of the obstacle including the highest point HP whose danger degree DD has been determined to be "2" is to be displayed in red. The image area of the obstacle including the highest point HP whose danger degree DD has been determined to be "1" is to be displayed in yellow.

At Step 550, the CPU 11 displays the periphery screen 300 on the display unit 30, and proceeds to Step 595 to tentatively terminate the present routine. More specifically, the CPU 11 displays an "image obtained by combining the camera image included in the camera image information which has been read out at Step 505 with the camera image which has been identified at Step 525" on the camera image display area 310. Further, the CPU 11 superimposes the present ground areas 320 on the image areas which have been identified at Step 525, and superimposes the predicted ground areas 330 on the image areas which have been identified at Step 530. The CPU 11 displays the image area which has been identified at Step 545 in the color corresponding to the danger degree DD.

For instance, in the example illustrated in FIG. 3A, the danger degree DD of the obstacle A is determined to be "1" so that the obstacle A is displayed in yellow. When the driver steers an unillustrated steering wheel to the left direction immediately after the obstacle A started to be displayed in yellow so that the own vehicle SV turns left, the predicted travel path RCR changes its shape from a straight line to a left curve. Therefore, the travel path area ECA changes its shape so as to curve left, as illustrated in FIG. 3B. In this case, the obstacle A is no longer present in the travel path area ECA, and the obstacle B is present in the travel path area ECA. When it is assumed that the danger degree DD of the obstacle B is "2" in the example illustrated in FIG. 3B, the obstacle B is displayed in red, and the obstacle A is displayed in original color (such as green, blue, and white).

As understood from the above examples, when the gradient GR between two highest points which are adjacent to each other is greater than the threshold gradient GRth, the control device determines that the obstacle including the highest point which is father from the own vehicle SV between the two highest points is the alert obstacle. Thus, the control device can detect the obstacle which the own vehicle SV cannot travel (run, go) over as the alert obstacle, and can reduce the possibility that the control device misdetects the obstacle which the own vehicle SV can travel (run, go) over as the alert obstacle. Therefore, the control device can reduce the possibility that the alert image annoys the driver.

<Modification Example of Control Device>

Figure 7:
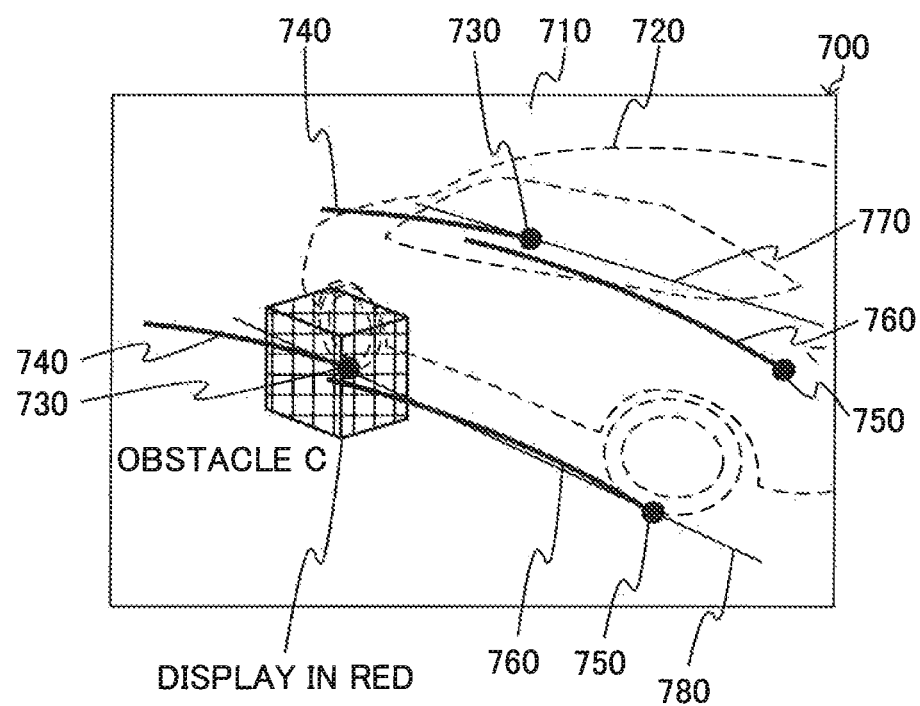
FIG. 7 is an explanatory diagram illustrating a turn display screen according to a modification example of the control device.

A modification of the control device differs from the above control device in a respect that this modification displays a turn display screen 700 illustrated in FIG. 7 in place of the above periphery screen 300 when an unillustrated directional indicator is in an on state (that is, when a turn signal lump is in an intermittently flashing state). Hereinafter, the difference is mainly described below.

When the driver has the own vehicle SV turn left, the driver operates a directional indicator lever such that a left directional indicator (a left turn signal lump) is set to the on state (the intermittently flashing state). On the other hand, when the driver has the own vehicle SV turn right, the driver operates the directional indicator lever such that a right directional indicator (a right turn signal lump) is set to the on state (the intermittently flashing state). In the modification, an unillustrated left camera is arranged in a left side mirror of the own vehicle SV, and an unillustrated right camera is arranged in a right side mirror of the own vehicle SV. The left camera photographs a left side area of the own vehicle SV. The right camera photographs a right side area of the own vehicle SV. Further, an unillustrated left millimeter-wave radar is arranged at a left end in the front end of the own vehicle SV, and an unillustrated right millimeter-wave radar is arranged at a right end in the front end of the own vehicle SV. The left millimeter-wave radar detects the obstacle in the left side of the own vehicle SV. The right millimeter-wave radar detects the obstacle in the right side of the own vehicle SV.

In the modification example, when the unillustrated directional indicator is in the on state, the control device obtains a predicted left travel path LEC' through parallelly shifting the predicted left travel path LEC illustrated in FIG. 2 to the left direction of the own vehicle SV by a predetermined distance αL, and obtains a predicted right travel path REC' through parallelly shifting the predicted right travel path REC illustrated in FIG. 2 to the right direction of the own vehicle SV by a predetermined distance αR. It should be noted that the predicted left travel path LEC' and the predicted right travel path REC" extend to a rear end of the own vehicle SV. Further, the control device specifies, as an expanded travel path area ECA', an area between the predicted left travel path LEC' and the predicted right travel path REC'.

Thereafter, in the modification example, the control device determines whether or not the feature point is present in the expanded travel path area ECA' based on a detection result obtained by the left millimeter-wave radar and a detection result obtained by the right millimeter-wave radar. When the feature point is present in the expanded travel path area ECA', the control device determines whether or not the height Y of that feature point is higher the threshold height Yth.

When the height of that feature point is greater than the threshold height Yth, the control device determines that the danger degree DD of that feature point is "2" to store the information representing that into the RAM 13. On the other hand, when the height of that feature point is equal to or lower than the threshold height Yth, the control device determines that the danger degree DD of that feature point is "0", in other words, that the feature point is not the obstacle.

The turn display screen 700 of the modification example is described with reference to FIG. 7. An image of the left side of the own vehicle SV included in images photographed by "the camera sensor 21, the left camera, and the right camera" is displayed on the turn display screen 700, when the own vehicle SV turns left. An image of the right side of the own vehicle SV included in images photographed by "the camera sensor 21, the left camera, and the right camera" is displayed on the turn display screen 700, when the own vehicle SV turns right.

The turn display screen 700 includes a camera image display area 710, an own vehicle image 720, two front wheel present ground areas 730, two front wheel predicted ground areas 740, two rear wheel present ground areas 750, two rear wheel predicted ground areas 760, a right side surface displaying line segment 770, and a left side surface displaying line segment 780.

An image (a camera image) photographed by the camera sensor 21, the left camera, and the right camera is displayed on the camera image display area 710. An image of the own vehicle SV when the own vehicle SV turns, which has been set in advance, is displayed as the own vehicle image 720. One of the front wheel present ground areas 730 is superimposed on an image area in the camera image corresponding to an area where the left front wheel of the own vehicle SV is grounded. The other is superimposed on an image area in the camera image corresponding to an area where the right front wheel of the own vehicle SV is grounded. One of the front wheel predicted ground areas 740 is superimposed on an image area in the camera image corresponding to an area where the left front wheel of the own vehicle SV is predicted to be grounded. The other is superimposed on an image area in the camera image corresponding to an area where the right front wheel of the own vehicle SV is predicted to be grounded.

One of the rear wheel present ground areas 750 is superimposed on an image area in the camera image corresponding to an area where a left rear wheel of the own vehicle SV is grounded. The other is superimposed on an image area in the camera image corresponding to an area where a right rear wheel of the own vehicle SV is grounded. One of the rear wheel predicted ground areas 760 is superimposed on an image area in the camera image corresponding to an area where the left rear wheel of the own vehicle SV is predicted to be grounded. The other is superimposed on an image area in the camera image corresponding to an area where the right rear wheel of the own vehicle SV is predicted to be grounded. The right side surface displaying line segment 770 is superimposed on an "image area in the camera image which the right side of the front side of the vehicle-body of the own vehicle SV will pass through under an assumption that the own vehicle SV travels straight". The left side surface displaying line segment 780 is superimposed on an "image area in the camera image which the left side of the front side of the vehicle-body of the own vehicle SV will pass through under an assumption that the own vehicle SV travels straight".

Further, when the obstacle whose danger degree DD is "2" (referring to an obstacle C illustrated in FIG. 7) is present in the expanded travel path area ECA', the control device displays an image area corresponding to that obstacle included in the image displayed on the camera image display area 710 in red.

Thus, the driver may take a look at the turn display screen 700 when the own vehicle SV turns to confirm whether or not there is the obstacle which is likely to collide/contact with at least one of two sides of the one vehicle SV.

The present disclosure is not limited to the above-mentioned embodiment, and can adopts various modifications of the present disclosure. The display unit 30 may be a Head-Up Display (HUD), a Multi Information Display (MID), a touch panel of a navigation device, or the like. The MID is a display panel which is arranged on a dash board and which includes a speed meter, a taco meter, a fuel gauge, an water temperature gauge, an od/trip meter, an warning lump, and the like.

Further, an unillustrated millimeter-wave radar and/or an unillustrated infrared radar may detect at least one of the distance between the own vehicle SV and the obstacle, the direction of the obstacle in relation to the own vehicle SV, and the height of the obstacle.

Further, the control device may detect a plurality of the highest points in one (single) obstacle. In this case, the control device displays this obstacle in the color corresponding to the danger degree DD which is the highest in the danger degrees DD of the plurality of the highest points in this obstacle.

Further, the control device displays the obstacle whose danger degree DD is "2" in red, and displays the obstacle whose danger degree DD is "1" in yellow, however the display mode corresponding to the danger degree DD is not limited to this. The control device may display the obstacle in the different display mode corresponding to the danger degree DD. For instance, the control device may display a frame which surrounds the obstacle whose danger degree DD is "2" in a solid line, and may display a frame which surrounds the obstacle whose danger degree DD is "1" in a dot line.

Further, the control device may display the turn display screen 700 when the driver operates an unillustrated button for the turn display screen 700. The control device may translucently display the own vehicle image 720 in the turn display screen 700. Thus, the driver can look at the image of an area in the vicinity of the opposite side area of the own vehicle SV to one side area of the own vehicle SV which is displayed on the turn screen 700 through the translucent own vehicle image 720.

What is claimed is:

1. A periphery image display control device including a display control unit for displaying an image photographed by a camera which photographs a periphery area around an own vehicle on a display unit comprising:
    a prediction unit for predicting a travel path area which a vehicle-body of the own vehicle will pass through when the own vehicle travels along a predicted travel path;
    an obstacle detection unit for obtaining obstacle information including locations of obstacle points which are included in at least one of obstacles present in the travel path area and whose heights become higher as the obstacle points are farther from the own vehicle, and heights of the obstacle points in relation to the own vehicle; and
    a determination unit configured to:
        determine whether or not a first ratio is greater than a threshold, the first ratio being a ratio of a subtraction value obtained by subtracting a height of a first obstacle point which is nearer from the own vehicle between two of the obstacle points which are adjacent to each other in a direction of the predicted travel path from a height of a second obstacle point which is farther from the own vehicle between the two of the obstacle points, to a distance between the first obstacle point and the second obstacle point along the predicted travel path, and the threshold being a value which is preset based on a second ratio of a height between a ground point of a front wheel of the own vehicle and a bottom end at a front end of the vehicle-body of the own vehicle to a distance between the front end and the ground point in a horizontal direction of the vehicle-body; and
        determine that the obstacle including the second obstacle point is an alert obstacle, when the first ratio is determined to be greater than the threshold, and
    wherein the display control unit is configured to display an alert screen for causing the driver to pay attention to the alert obstacle on the display unit.

2. The periphery image display control device according to claim 1,
    wherein the determination unit is configured to have a display mode for the alert obstacle whose subtraction value is greater than the height between the ground point and the bottom end different from a display mode for the alert obstacle whose subtraction value is equal to or smaller than the height between the ground point and the bottom end.

3. The periphery image display control device according to claim 1,
    wherein,
    the obstacle detection unit is configured to obtain expanded area information including a location of an expanded area obstacle point which is included in the obstacle present in an expanded area and a height of the expanded area obstacle point, the expanded area being an area obtained by expanding a left end of the travel path area to a left direction in a width direction of the own vehicle and by expanding a right end of the travel path area to a right direction in the width direction of the own vehicle, and the determination unit is configured to:
 determine whether or not there is the expanded obstacle point whose height is higher than the height between the ground point and the bottom end based on the expanded area information; and
 determine that the obstacle including the expanded area obstacle point is the alert obstacle, when there is the expanded area obstacle point whose height is higher than the height between the ground point and the bottom end.

\* \* \* \* \*